(12) United States Patent
Zushi et al.

(10) Patent No.: US 11,279,238 B2
(45) Date of Patent: Mar. 22, 2022

(54) METHOD FOR CONTROLLING POWER CONVERSION DEVICE, AND POWER CONVERSION DEVICE

(71) Applicants: NISSAN MOTOR CO., LTD., Yokohama (JP); RENAULT S.A.S., Boulogne-Billancourt (FR)

(72) Inventors: Yusuke Zushi, Kanagawa (JP); Shigeharu Yamagami, Kanagawa (JP); Yuji Saito, Kanagawa (JP); Yosuke Tomita, Kanagawa (JP); Keisuke Takemoto, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/291,095

(22) PCT Filed: Nov. 5, 2018

(86) PCT No.: PCT/IB2018/001330
§ 371 (c)(1),
(2) Date: May 4, 2021

(87) PCT Pub. No.: WO2020/095080
PCT Pub. Date: May 14, 2020

(65) Prior Publication Data
US 2022/0001750 A1    Jan. 6, 2022

(51) Int. Cl.
*B60L 8/00* (2006.01)
*B60L 58/12* (2019.01)

(52) U.S. Cl.
CPC .............. *B60L 8/003* (2013.01); *B60L 58/12* (2019.02); *B60L 2240/427* (2013.01)

(58) Field of Classification Search
CPC .. B60L 8/003; B60L 8/00; B60L 58/12; B60L 2240/427
See application file for complete search history.

(56) References Cited

FOREIGN PATENT DOCUMENTS

| JP | 2015-133870 A | 7/2015 |
| JP | 2015-154526 A | 8/2015 |
| JP | 2018-98820 A | 6/2018 |

*Primary Examiner* — Robert L Deberadinis
(74) *Attorney, Agent, or Firm* — Foley & Lardner LLP

(57) ABSTRACT

The present invention is related to a control method for controlling a power converter including a first power conversion circuit 11 and a second power conversion circuit 12 by using a control circuit 13. The first power conversion circuit 11 is connected to a solar cell module 1 and a capacitor 2, converts output power of the solar cell module 1, and outputs the converted power to the capacitor 2, the second power conversion circuit 12 is connected to the capacitor 2, and converts a voltage at a connection terminal connected to the capacitor 2. The control method comprises step of controlling operation of the second power conversion circuit 12 based on the output voltage of the solar cell module 1, to use output power of the second power conversion circuit 12 for charging the capacitor 2.

16 Claims, 7 Drawing Sheets

METHOD FOR CONTROLLING POWER CONVERSION DEVICE, AND POWER CONVERSION DEVICE

TECHNICAL FIELD

The present invention relates to a control method and a power converter of the power converter.

BACKGROUND ART

A known power conversion system comprises a first power conversion means for converting output power from the photovoltaic device and for outputting the power after the power conversion, a first storage battery capable of storing the output power from the first power conversion means, a second power conversion means for converting output power from the first storage battery by discharging the first storage battery and for outputting the power after the power conversion, a second storage battery capable of storing the output power from the second power conversion means, and a control means for controlling the driving of the second power conversion means by comparing a charging remaining amount of the first storage battery with the threshold value for the first storage battery (Patent Document 1). In the power conversion system, the second battery includes at least one of an auxiliary battery for supplying the operating power to the auxiliary machine and a main battery for supplying the operating power to the traveling driving source of a vehicle.

CITATION LIST

Patent Document

JP 2015-154526 A

SUMMARY OF THE INVENTION

Problem to be Solved by the Invention

The conventional technique disclosed in the prior art has a problem that the power conversion system becomes large because the first storage battery is provided separately from the second storage battery for supplying power to auxiliary equipment and the like.

An object to be solved by the present invention is to provide a control method of a power converter apparatus and the power converter apparatus capable of preventing an increase in size.

Means for Solving Problem

The present invention solves the above problem by controlling operation of a second power conversion circuit for converting voltage at a connection terminal of the capacitor based on output voltage of the solar cell module to use the output power of the second power conversion circuit to the capacitor.

Effect of the Invention

According to the present invention, it is possible to prevent an increase in size.

BRIEF DESCRIPTION OF DRAWING(S)

MODE(S) FOR CARRYING OUT THE INVENTION

Hereinafter, embodiments of the present invention will be described with reference to the drawings.

First Embodiment

Figure 1:
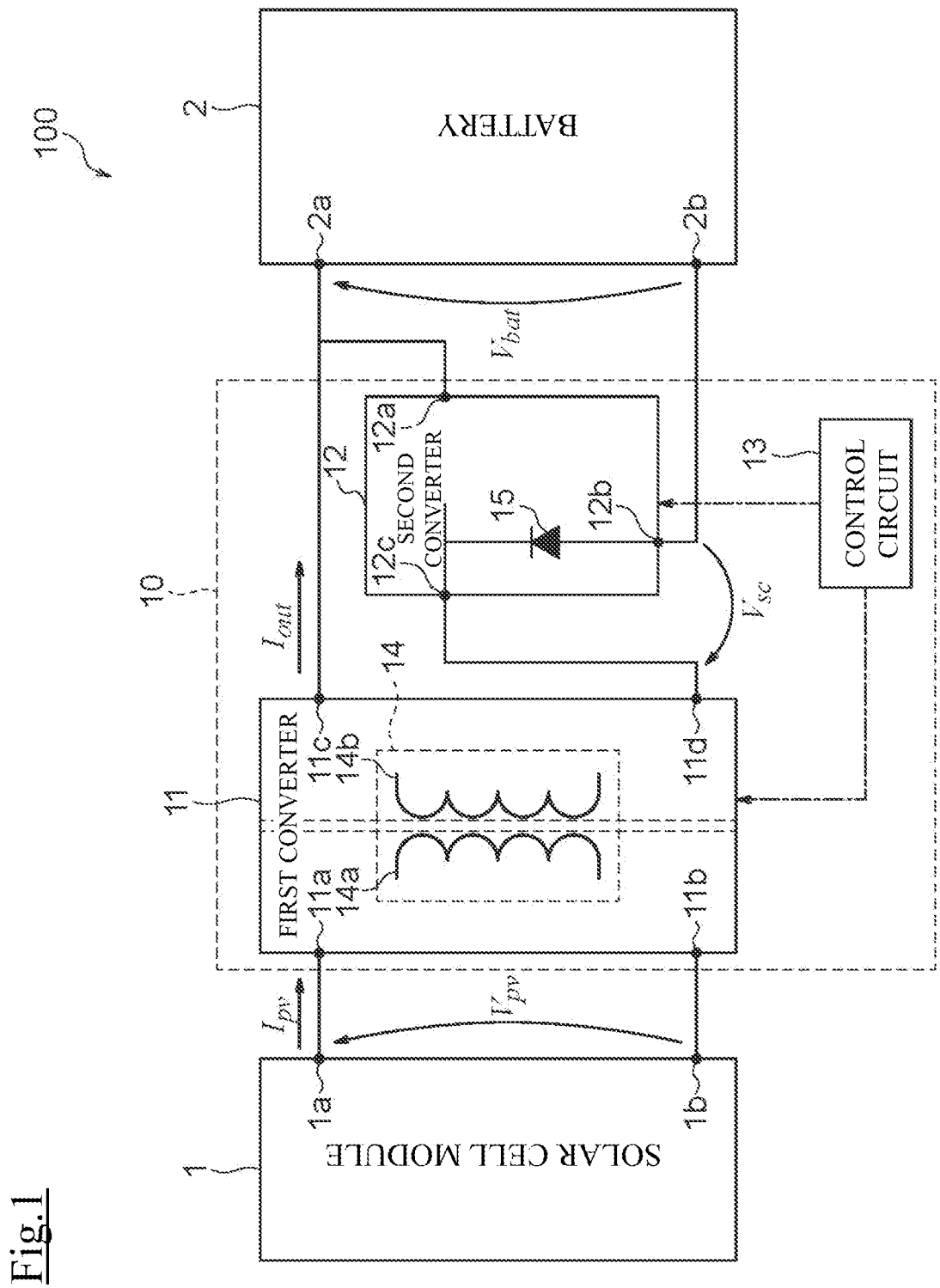
FIG. 1 is a circuit diagram of a power conversion system including a power conversion apparatus according to a first embodiment.

A control method of the power converter apparatus and the power converter apparatus according to the present embodiment will be described with reference to FIG. 1. FIG. 1 is a circuit diagram of a power conversion system 100 including the power converter 10 according to the present embodiment. A power conversion system 100 according to the present embodiment includes a solar cell module 1, a battery 2, and a power converter 10. The power conversion system 100 is a system that converts the power output from the solar cell module 1 by the power converter 10, and supplies the converted power to the battery 2. The power conversion system 100, for example, is used in a charging system mounted on vehicle. The power conversion system 100 does not necessarily need to be mounted on vehicle and may be mounted on other devices other than vehicle.

The solar cell module 1 is a module including a plurality of solar cell. A solar cell is an energy conversion element that absorbs the light energy of sunlight and converts the light energy of sunlight into electricity. The solar cell module 1 is, for example, a solar panel. When a solar cell with a silicon element is used, the output voltage of the solar cell becomes less than or equal to 1V. To increase the output voltage of the solar cell module 1, the solar cell module 1 includes a plurality of solar cell connected in series.

Further, the output possible power (generated power) of the solar cell module 1 varies depending on the intensity of light (amount of sunshine) irradiated to the solar cell module 1. When the shadow is applied to the solar cell module 1, the magnitude of the voltage output by the solar cell module 1 will be described later.

The solar cell module 1 has output terminals 1a and 1b. Power generated by the solar cell module 1 is outputted from output terminals 1a and 1b. The output terminal 1a is connected to the input terminal 11a of the first converter 11, the output terminal 1b is connected to the input terminal 11b of the first converter 11. Thus, the power generated by the solar cell module 1 is output to the first converter 11. In FIG. 1, the output voltage Vpv of the solar cell module 1 shows the voltage between output terminals 1a and 1b, the output current Ipv of the solar cell module 1 shows current flowing from the output terminal 1a to the input terminal 11a of the first converter 11. Incidentally, for ease of explanation, the output terminal 1a is a terminal of higher potential side than output terminal 1b.

Power is supplied from the power converter 10 to the battery 2. The battery 2 is charged by the output power of the power converter 10. The battery 2 is, for example, a lithium ion secondary battery. The battery 2 has a connecting terminal 2a, 2b as a terminal that can be connected to a device other than the battery 2. The connection terminal 2a is connected to the output terminal 11c of the first converter 11 and the output terminal 12a of the second converter 12, and the connection terminal 2b is connected to the reference terminal 12b of the second converter. Thus, the current is inputted from output terminal 11c of the first converter 11 to the connecting terminal 2a and the battery 2 is charged. Further, the voltage of the battery 2 is input to the second converter 12. The operation of the second converter 12 based on the voltage of the battery 2 will be described later. In FIG. 1, the output current Iout of the first converter 11 shows current flowing from the output terminal 11c of the first converter 11 to the connection terminal 2a, and the voltage Vbat shows voltage between the connection terminal 2a and the connection terminal 2b. For easy to explanation, the connection terminal 2a is a terminal of higher potential side than the connection terminal 2b. Further, the connection terminal 2a is connected to the positive electrode of the battery 2, the connection terminal 2b is assumed to be connected to the negative electrode of the battery 2.

In the present embodiment, the voltage (Vbat) of the battery 2 is higher than the output voltage (Vpv) of the solar cell module 1. For example, the maximum value of the output voltage of the solar cell module 1 is 60V or less, the voltage of the battery 2 is 4 times or more high than the maximum voltage of the solar cell module 1. Therefore, the power converter 10 to be described later has a function of boosting the input voltage.

The output voltage of the solar cell module 1 is boosted by the power converter 10, the boosted voltage is output to the battery 2.

Next, a description will be given power converter 10. As shown in FIG. 1, the power converter 10 according to the present embodiment includes a first converter 11, a second converter 12, and a control circuit 13.

The first converter 11 converts the output power of the solar cell module 1, and outputs the converted power to the battery 2. The first converter 11 transforms the direct voltage to be input, and outputs the transformed voltage as a direct voltage, so-called DC-DC converters. Further, in the present embodiment, the first converter 11 has an isolation transformer 14, and is an isolation type of DC-DC converter. The Isolation transformer 14 has a primary winding 14a provided on the input side, and a secondary winding 14b provided on the output side. Furthermore, the first converter 11 has a function of boosting the input voltage, and is a so-called boost converter. The first converter 11 includes, for example, a inverter circuit connected to the primary winding 14a, and a rectifier circuit connected to the secondary winding 14b.

The first converter 11 has an input terminals 11a, and 11b, and the output terminals 11c, 11d. The input terminal 11a is connected to the output terminal 1a of the solar cell module 1, the input terminal 11b is connected to the output terminal 1b of the solar cell module 1. The output terminal 11c is connected to the connection terminal 2a of the battery 2, output terminal 11d is connected to output terminal 12c of the second converter 12. Incidentally, for easy to explanation, the input terminal 11a is a terminal of higher potential side than the input terminal 11b, also output terminal 11c is a terminal of higher potential side than output terminal 11d.

The input voltage and the output voltage of the first converter 11 will be described. The input voltage of the first converter 11 is the magnitude of the potential of the input terminal 11a with respect to the potential of the input terminal 11b. In other words, the input voltage of the first converter 11 is the voltage of the input terminal 11a when the potential of the input terminal 11b is the reference potential. In the present embodiment, the input voltage of the first converter 11 corresponds to the output voltage of the solar cell module 1 (Vpv). The output voltage of the first converter 11 is the magnitude of the potential of output terminal 11c with respect to the potential of output terminal 11d. In other words, the output voltage of the first converter 11 is a voltage of output terminal 11c when the potential of output terminal 11d is the reference potential.

In the present embodiment, the input terminals 11a, 11b and output terminal s11c, 11d, by the isolation transformer 14 are isolated. Therefore, in the first converter 11, the reference potential of the input side and the reference potential of the output side can be a different potential. Thus, in accordance with the reference potential, it is possible to control the output voltage of the first converter 11.

For example, the first converter 11 has a function that can boost the input voltage four times, 3V is input to the first converter 11. However, the voltage of the input terminal 11b is a zero voltage. When the voltage of output terminal 11d is zero voltage, the output voltage (the voltage of output terminal 11c) of the first converter 11 becomes 12V. From this condition, when the voltage of output terminal 11d is raised from the zero voltage to 1V, the output voltage (the voltage of output terminal 11c) of the first converter 11 rises to 13V since 1V is added to the 12V which is boosted by the first converter. By controlling the voltage of output terminal 11d, a method of controlling the output voltage of the first converter 11 will be described later.

A control signal is input from the control circuit 13 to the first converter 11. The first converter 11, in response to the control signal, boosts the input voltage which is the output power of the solar cell module 1. The control signal is, for example, a signal for turning on and off switching elements in the inverter circuit. The first converter 11 boosts the output voltage of the solar cell module 1 in accordance with the switching frequency of switching element and the duty ratio (value indicating the on-period per unit time). For example, in accordance with the switching frequency, the voltage boosted by the first converter 11 is boosted varies.

The magnitude of the voltage boosted by the first converter 11 is determined by the boost ratio. In the present embodiment, the boost ratio is a ratio of the output voltage to the input voltage when the potential of the input terminal 11b and output terminal 11d is the same potential. Control circuit 13, by controlling the control signal, is possible to change the boost ratio of the first converter 11. The boost ratio has an upper limit and a lower limit. The upper limit of the boost ratio is determined according to the characteristics of the isolation transformer 14. In the present embodiment, the upper limit value (Nmax) of the boost ratio is calculated by dividing the number (Ns) of windings of the secondary winding by the number (Np) of windings of the primary winding 14a(Nmax=Ns/Np). In the following explanation, for easy to explanation, the upper limit of the boost ratio, also referred to as the maximum boost ratio (Nmax).

Figure 2:
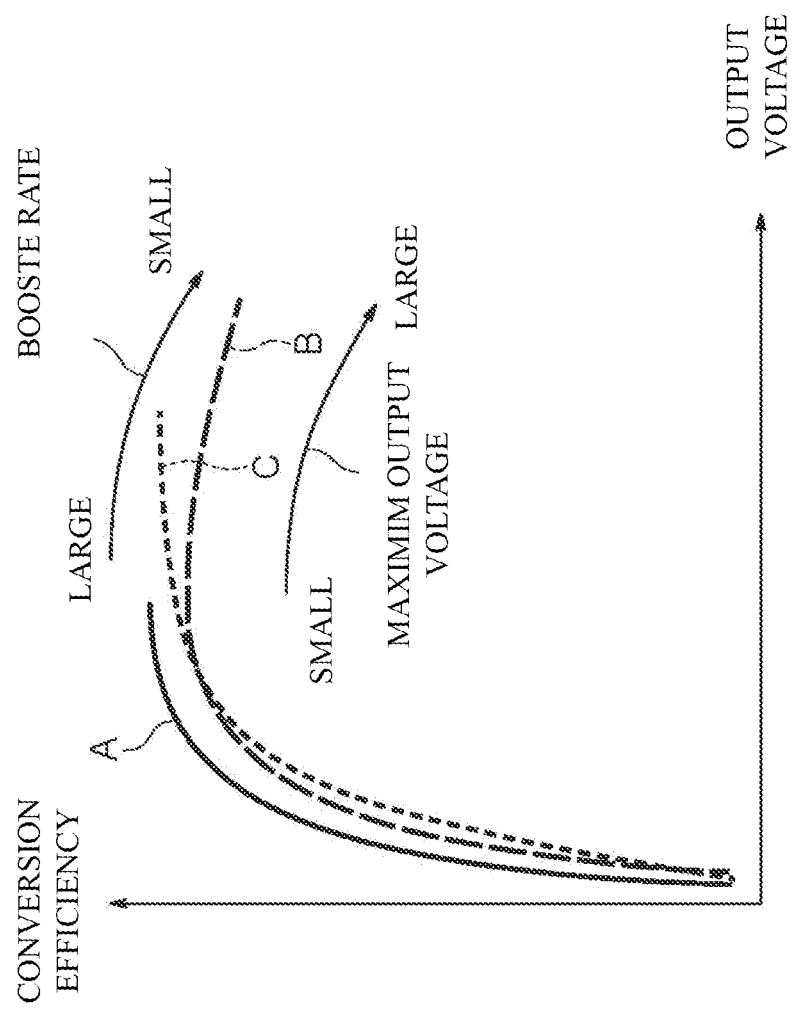
FIG. 2 is a diagram for explaining the characteristics of the output power and conversion efficiency with respect to a boost ratio.

Next, with reference to FIG. 2, a description will explain the output power and conversion efficiency with respect to the boost ratio of the first converter 11 has. FIG. 2 is a diagram for explaining the properties of the output power and conversion efficiency with respect to the boost ratio. In FIG. 2, the horizontal axis represents the output power of the first converter 11, and the vertical axis represents the conversion efficiency (the ratio of the output power to the input power) of the first converter 11.

In the FIG. 2, the curve A shows the properties of the first converter 11 when operated at the maximum boost ratio (Nmax), the curve B shows the characteristics of the first converter 11 when operated at the minimum boost ratio (Nmin), the curve C show the properties of the first converter 11 when operated at a boost ratio which is smaller than the maximum boost ratio and is larger than the minimum boost ratio. Incidentally, FIG. 2 is an example showing the relationship between the output power and the conversion efficiency of the first converter 11, the respective boost ratios corresponding to the curves A, B, and C are not limited to the boost ratio described above.

As shown in FIG. 2, the larger the boost ratio, the larger conversion efficiency and the smaller the maximum value (hereinafter referred to as maximum output power) of the power that can be output. On the other hand, the smaller the boost ratio, the larger the maximum output power and the smaller the conversion efficiency. Therefore, in order to improve conversion efficiency, it is preferable to operate the first converter 11 so that the boost ratio is large. On the other hand, in order to increase the output power, it is preferable to operate the first converter 11 so that the boost ratio is small. Thus, with respect to the boost ratio, the output power and conversion efficiency is under a trade-off relationship. In general, the rated voltage of the first converter 11 is lower than the voltage (hereinafter also referred to as maximum output voltage) when outputting the maximum output power. Therefore, the boost ratio (Nopt) when the first converter 11 outputs the rated voltage is less than the maximum boost ratio (Nmax). In the following description, for easy to explanation, the boost ratio when the first converter 11 outputs the rated voltage, also referred to as the rated boost ratio (Nopt). Further, the relationship between the maximum output power and the conversion efficiency when operated at the rated boost ratio is the most balanced and optimal as compared to the relationship between the maximum output power and the conversion efficiency when operated at another boost ratio. Referring to FIG. 2, the rated boost ratio (Nopt) corresponds to the curve B Next, a description will explain a second converter 12. The second converter 12 converts the voltage of the battery 2, and outputs the converted voltage to the first converter 11. The second converter 12, similarly to the first converter 11 is a so-called DC-DC converter. The second converter 12 has a function of step-down the input voltage, a so-called step-down converter. The second converter 12 is, for example, a step-down converter of the charge pump type. The second converter 12 is not particularly limited as to whether or not the input side and the output side or the second converter 12 are isolated, and may be an isolated DC-DC converter or a non-isolated DC-DC converter. The second converter 12, whether the input-side and the output-side is isolated is not particularly limited, may be an isolation type DC-DC converter, may be a non-isolation type DC-DC converter.

The second converter 12 has an input terminal 12a, a reference terminal 12b, and an output terminal 12c. Input terminal 12a is connected to the connection terminal 2a of the battery 2, the reference terminal 12b is connected to the connection terminal 2b of the battery 2. Output terminal 12c is connected to output terminal 11d of the first converter 11.

For easy to explanation, the reference terminal 12b is a terminal that defines the reference potential of the second converter 12. Further, the input terminal 12a is a terminal of higher potential side than the reference terminal 12b, output terminal 12c is a terminal of higher potential side than the reference terminal 12b.

The input voltage and the output voltage of the second converter 12 will be described. The input voltage of the second converter 12 is the magnitude of the potential of the input terminal 12a with respect to the potential of the reference terminal 12b. In other words, the input voltage of the second converter 12 is the voltage of the input terminal 12a when a potential voltage of the reference terminal 12b is the reference potential In the present embodiment, the input voltage of the second converter 12 corresponds to the voltage (Vbat) of the battery 2. The output voltage of the second converter 12 is the magnitude of the potential of output terminal 12c with respect to the potential of the reference terminal 12b. In other words, the output voltage of the second converter 12 is the voltage of output terminal 12c when using the potential of the reference terminal 12b as a reference. In the present embodiment, the second converter 12 has a reference terminal 12b serving as a common reference potential to the input voltage and the output voltage, respectively. Therefore, in the second converter, the input voltage and the output voltage become a voltage based on a common potential.

The voltage of output terminal 11d of the first converter 11 varies according to the output voltage of the second converter 12 since the output terminal 12c of the second converter 12, is connected to output terminal 11d of the first converter 11. For example, the second converter 12 steps down the voltage of the battery 2, and outputs a voltage obtained by step-down, the voltage of output terminal 11d is the output voltage of the second converter 12. In this case, the output voltage (the voltage of the output terminal 11c) of the first converter 11 is the voltage obtained by superimposing (adding) the output voltage of the second converter 12 to the voltage boosted by the first converter 11. In FIG. 1, the output voltage Vsc of the second converter 12 shows the voltage between output terminal 12c and the reference terminal 12b.

A control signal is input from the control circuit 13 to be described later to the second converter 12. The second converter 12, in response to the control signal, step down the voltage of the battery 2 which is an input voltage. The control signal includes, for example, a signal for turning on and off a switching element in the charge pump. The second converter 12 step-down the voltage of the battery 2 in accordance with the switching frequency and duty cycle of switching element. For example, depending on the switching frequency, the voltage at which the second converter 12 is stepped down varies.

Further, the second converter 12 has a diode 15 on the output-side. The anode terminal of a diode 15 is connected to the reference terminal 12b, the cathode terminal of the diode 15 is connected to output terminal 12c. In this embodiment, when the operation of the second converter 12 is stopped, output terminal 12c and the reference terminal 12b is conducted through diode 15. Thus, the potential of output terminal 11d of the first converter 11 becomes the same potential as the potential of the connecting terminal 2b of the battery 2. In this case, the output voltage of the first converter 11 is a voltage of output terminal 11c when using the potential of the connecting terminal 2b of the battery 2 as the reference potential.

Here, using control method of the power converter and the power converter according to the comparative example different from the present embodiment, the problem of the converter generated when boosting the output voltage of the solar cell module 1 will be described. Power converter according to the comparative example, as compared with the power converter according to the present embodiment, except that it does not include a second converter 12 is assumed to have the same configuration. That is, the power conversion apparatus according to the comparative example boosts the output voltage of the solar cell module, and outputs the boosted voltage to the battery.

In general, a solar cell module includes a series connection of a plurality of solar cells as described above. Therefore, for example, when the shadow is applied to the solar cell module and the solar light is not irradiated to a part of the solar cell (also referred to as partial shadow), the solar cell that is not irradiated with sunlight losses a function as an element of high resistance, the output voltage of the solar cell module is greatly reduced. To solve this problem, the solar cell module is provided with a diode for bypassing current flowing through the solar cell when the voltage generated by the solar cell is lower than a predetermined value, which is connected in parallel to the solar cell. Since current flowing through the solar cell in which sunlight is not irradiated is bypassed by diode, the voltage generated by the solar cell in which sunlight is irradiated is output as the output voltage of the solar cell module. However, in the solar cell module, a voltage drop occurs so that the output voltage of the solar cell module drops due to current flowing through diode.

The output range of solar cell modules is wide-ranging since the solar cell modules are affected by solar power, so unlike direct constant-voltage sources that are not affected by solar power. On the other hand, the voltage of the battery is not affected by sunlight. In other words, the voltage input to the converter is variable due to the influence of sunlight, whereas the voltage output from the converter is not variable due to the influence of sunlight. Therefore, for example, when a shadow is applied to a part of the solar module and the output voltage of the solar cell module is lowered, in the power converter according to the comparative example, the converter must be operated for increasing the boost ratio. However, the output voltage of the solar cell module is extremely low, and even if the converter is operated at the highest boost ratio (Nmax), the converter may not be able to boost the output voltage of the solar cell module to the voltage of the battery. In this case, even if the solar cell module is generating power, it is impossible to charge the battery.

In contrast, the power converter 10 according to the present embodiment has the second converter 12 in order to output a voltage corresponding to the voltage of the battery 2, even if the output voltage of the solar cell module 1 varies. By the second converter 12 outputs a predetermined voltage to output terminal 11*d* of the first converter 11, as compared with when operated only by the first converter 11, the output voltage (the voltage of output terminal 11*c*) of the first converter 11 can be increased. Thus, even when the output voltage of the solar cell module 1 is extremely low and the first converter 11 cannot boost the output voltage of the solar cell module 1 to the voltage of the battery 2, it is possible to charge the battery 2. Further, it is possible to reduce the maximum boost ratio (Nmax) required for the first converter 11, the first converter 11 can be operated at less than the maximum boost ratio, it is possible to increase the maximum output power.

Further, in the present embodiment, the second converter 12, in order to step down the voltage of the battery 2, by the second converter 12 is operated, it is also conceivable that the amount of charge of the battery 2 is reduced. However, in the present embodiment, the second converter 12 may have a function of outputting a predetermined voltage based on the voltage of at least the battery 2, it is possible to reduce the power consumption of the second converter 12 than the power consumption of the first converter 11. The output power of the second converter 12 is summed with the output power of the first converter 11 and is supplied to the battery 2. Here, when comparing the output power of the first converter 11 with the output power of the second converter 12, the output power of the first converter 11 is extremely larger than the output power of the second converter 12 since the output power of the first converter 11 is the generated power of the solar cell module 1. Due to such power magnitude relationships, the power of the battery 2 consumed by the second converter 12 is very low relative to the power supplied to the battery 2. That is, when comparing the case in which the second converter 12 is not operated and the power can not be supplied to the battery 2 and the case in which the second converter 12 is operated and the power can be supplied to the battery 2, even if the power of the battery 2 is consumed for the operation of the second converter 12, as a result, the amount of charge to the battery 2 can be increased when the second converter 12 is operated.

The power conversion device 10 shown in FIG. 1 will be described again. The control circuit 13 includes a microcomputer having a CPU (Central Processing Unit), a ROM (Read Only Memory), a RAM (Random Access Memory), and a FPGA (Field Programmable Gate Array).

The information of the output voltage (Vpv) and the output current (Ipv) is input to the control circuit 13. For example, the voltage sensor (not shown) is connected in parallel to the voltage output terminal 1*a* and output terminal 1*b* of the solar cell module 1, the current sensor (not shown) is connected in series to the connection terminal 2*a* and the connection terminal 2*b* of the battery 2, and the voltage sensor (not shown) is connected in parallel to the connection terminal 2*a* and the connection terminal 2*b* of the battery 2. Then, by connecting the respective voltages sensor and the control circuit 13, the detected result of each voltage sensor is input to the control circuit 13.

Further, the control circuit 13 stores the properties of the first converter 11 and second converter 12 in advance to use information of the properties of the first converter 11 and second converter 12. Properties of the first converter 11 are determined by, for example, the circuit configuration and a control method, the characteristics of the output power, conversion efficiency with respect to the boost ratio, the maximum boost ratio (Nmax), the rated boost ratio (Nopt), the voltage range that can be output. Similarly, the properties of the second converter 12 are determined by, for example, the circuit configuration, a control method, the characteristics of the output power and the conversion efficiency with respect to the step-down ratio, the upper limit of the step-down ratio, the step-down ratio when outputting the rated voltage, the voltage range that can be output.

The control circuit 13 controls the operation of the first converter 11 to output power based on the generated power of the solar cell module 1 to the battery 2. Further, the control circuit 13, based on the output voltage of the solar cell module 1, determines whether to operate the second converter 12, when operating the second converter 12, the control circuit 13 control the operation of the second converter 12 to use the output power of the second converter 12 for charging the battery 2. Incidentally, operating the second converter 12 includes operating the second converter 12 since the first converter 11 cannot boost the voltage to the battery 2 and operating the second converter 12 since the first converter 11 can boost the voltage up to the voltage of the battery 2, but in order to improve the conversion efficiency of the first converter 11.

Figure 3:
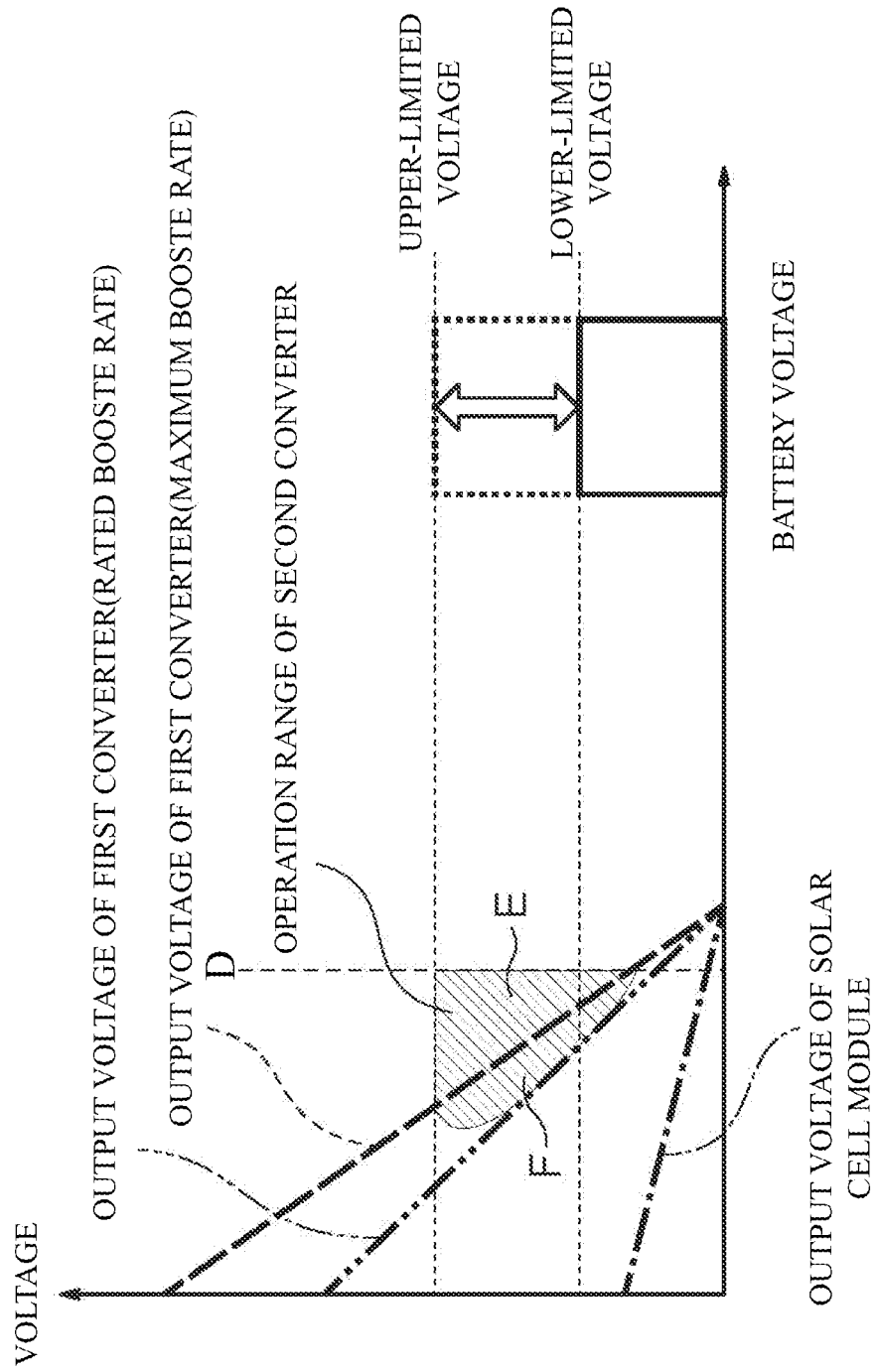
FIG. 3 is a diagram for explaining operation of the control circuit.

The specific operation of the control circuit 13 will be described with reference to FIG. 3. FIG. 3 is a diagram for explaining the operation of the control circuit 13. Further, on the left side of FIG. 3, the one-turn chain line shows the output voltage of the solar cell module 1, the two-dot chain line shows the output voltage of the first converter 11 when operated at the rated boost ratio (Nopt), broken line shows the output voltage of the first converter 11 when operated at the maximum boost ratio (Nmax). On the right side of FIG. 3, the voltage of the battery 2 is shown. When a lithium ion battery is used as the battery 2, the voltage of the battery 2 varies according to the state of charge. In FIG. 3, as the upper limit value and the lower limit value of the range in which the voltage of the battery 2 changes, showing the upper limit voltage and the lower limit voltage of the battery 2. Note that the output voltage of the solar cell module 1 and the first converter 11 shown in FIG. 3 shows characteristics when each reference potential is the same potential (e.g., zero voltage).

In the present embodiment, the control circuit 13 compares the generated power of the solar cell module 1 with the power consumed when the first converter 11 and second converter 12 is operated (hereinafter, also referred to as power consumption) the second converter 12, according to the comparison result, determines whether to operate.

Specifically, the control circuit 13 calculates the generated power by the solar cell module 1 from the output voltage (Vpv) and the output current (Ipv) of the solar cell module 1, and compares the calculated generated power with the power consumed by the first converter 11 and the second converter 12. The control circuit 13 determines that the second converter 12 is not operated when the generated power of the solar cell module 1 is smaller than the power consumption of the first converter 11 and the second converter 12. Conversely, the control circuit 13 determines that the second converter 12 is operated when the generated power of the solar cell module 1 is larger than the power consumption of the first converter 11 and second converter 12. By determining as above, even though the generated power of the solar cell module 1 is insufficient, it is possible to prevent unnecessary operation of the second converter 12, to reduce the power consumption of the power conversion system 100. Incidentally, the power consumption of the first converter 11 and the second converter 12 is power consumption in certain conditions, it is assumed that previously stored in memory such as a ROM.

In FIG. 3, the broken line D shows when the generated power of the solar cell module 1 matches the power consumption of the first converter 11 and second converter 12. In the range to the right of the dashed line D, since the generated power of the solar cell module 1 is smaller than the power consumption of the first converter 11 and second converter 12, the control circuit 13 does not operate the second converter 12. In the range to the left of the broken line D, since the generated power of the solar cell module 1 is larger than the power consumption of the first converter 11 and second converter 12, the control circuit 13 operates the second converter 12. Thereafter, a description will be given of the operation of the control circuit 13 in this range (the left-hand range of the dashed line D).

The control circuit 13, in determining whether to operate the second converter 12, first, determines whether the first converter 11 can boost the output voltage of the solar cell module 1 to the voltage of the battery 2. The control circuit 13 operates the second converter 12 when the first converter 11 determines that the output voltage of the solar cell module 1 cannot be boosted to the voltage of the battery 2.

Specifically, the control circuit 13 compares the product of the output voltage of the solar cell module 1 (Vpv) and the maximum boost ratio (Nmax) of the first converter 11 with the voltage of the battery 2 (Vbat). When the product of the output voltage of the solar cell module 1 and the maximum boost ratio of the first converter 11 is smaller than the voltage of the battery 2, the control circuit 13 determines that it is impossible to boost the voltage of the battery 2 by the first converter 11 only, and operates the second converter 12. In FIG. 3, area E shows a range in which the first converter 11 can not boost the output voltage of the solar cell module 1 to the voltage of the battery 2.

The control circuit 13 controls the operation of the second converter 12 so that the voltage (Vbat) of the battery 2 is stepped down and a predetermined voltage is output from the second converter 12. For example, the control circuit 13 calculates the product of the maximum boost ratio of the output voltage and the first converter 11 of the solar cell module 1, and calculates the difference between the voltage of the battery 2. Then, the control circuit 13 controls the operation of the second converter so that the output voltage of the second converter 12 becomes the calculated difference voltage. Thus, the voltage of output terminal 11*d* of the first converter 11 is obtained by superimposing the output voltage of the second converter 12 to the voltage obtained by boosting the output voltage of the solar cell module 1 at the maximum boost ratio, since the voltage of output terminal 11*d* of the first converter 11 becomes the output voltage of the second converter 12. For example, the output voltage of the solar cell module 1 is reduced due to the influence of the partial shadow, even when the first converter 11 can not boost the output voltage of the solar cell module 1 to the voltage of the battery 2, by operating the second converter 12, the first converter 11 can output a voltage corresponding to the voltage of the battery 2. At this time, the control circuit 13 controls the operation of the first converter 11 so as to operate at a boost ratio of the maximum boost ratio or its periphery.

Further, the control circuit 13 operates the second converter 12 based on the relationship between the output power of the first converter 11, the conversion efficiency of the first converter 11, and the power required for charging the battery 2, even when the first converter 11 can boost the output voltage of the solar cell module 1 to the voltage of the battery 2.

For example, by operating at a maximum boost ratio, the first converter 11 can boost the output voltage of the solar cell module 1 to the voltage of the battery 2. In this case, the control circuit 13 calculates the power required for charging the battery 2, the maximum output power of the first converter 11 when operated at the maximum boost ratio, compares the calculated two power. Then, the control circuit 13 operates the second converter 12 when the maximum output power of the first converter 11 is smaller than the power required for charging the battery 2.

In the relationship between the boost ratio and the maximum output power, as shown in FIG. 2, the larger the boost ratio, the smaller the maximum output power. Therefore, when operating the first converter 11 in the vicinity of the maximum boost ratio, the maximum output power is reduced, the first converter 11 may not be able to supply the power necessary for charging the battery 2. In the present embodiment, the control circuit 13 operates the second converter 12, even when the first converter 11 can boost the output voltage of the solar cell module 1 to the voltage of the battery 2, when the power required for charging the battery 2 can not be output.

The control circuit 13 determines whether to operate the second converter 12 based on the output voltage of the first converter 11 operated at a rated boost ratio, when the first converter 11 can boost the output voltage of the solar cell module 1 to the voltage of the battery 2

Specifically, the control circuit 13 stops the second converter 12 when the product of the output voltage of the solar cell module 1 (Vpv) and the rated boost ratio of the first converter 11 (Nopt) is greater than the voltage of the battery 2 (Vbat). In this case, the connection terminal 2b of output terminal 11d and the battery 2 of the first converter 11 is conducted, since the output terminal 12c and the reference terminal 12b of the second converter 12 are conducted through the diode 15. Thus, the output power of the second converter 12 is not used for charging the battery 2, the battery 2 is charged by the output power of the first converter 11. Further, the control circuit 13 operates the first converter 11 at a rated boost ratio. Thus, together with the conversion efficiency of the first converter 11 is optimal, it is possible to suppress the power consumption of the second converter 12 and improve the power conversion efficiency of the power converter 10. As such a situation, the solar light is irradiated to the entire solar cell module 1, the output voltage of the solar cell module 1 is assumed to be a relatively high scene. On the other hand, the control circuit 13 operates the second converter 12 when the product of the output voltage (Vpv) of the solar cell module 1 and the rated boost ratio (Nopt) of the first converter 11 is smaller than the voltage (bat) of the battery 2, and the product of the output voltage (Vpv) of the solar cell module 1 and the maximum boost ratio (Nmax) of the first converter 11 is larger than the voltage (Vbat) of the battery 2.

As such a situation, a shadow is applied to a portion of the solar cell module 1, the scene in which the output voltage of the solar cell module 1 is reduced is assumed. In FIG. 3, the region F shows a range in which the first converter 11 can boost the output voltage of the solar cell module 1 to the voltage of the battery 2, but operates the second converter 12.

Next, an example of the control of the first converter 11 and second converter 12 in the region F shown in FIG. 3. For example, the control circuit 13 controls the operation of the first converter 11 so that the input power of the first converter 11, that is, the generated power of the solar cell module 1 is maximized.

Such techniques include, for example, maximal power point tracking control (MPPT: Maximum Power Point Tracking). When MPPT method is used, even when the generated power of the solar cell module 1 changes due to changes in weather conditions or the like, the input power of the first converter 11 at that time can be maximized. For example, inside the first converter 11, by providing a MPPT control circuit (not shown), it is possible to maximize the input power of the first converter 11.

Further, the control circuit 13 controls the operation of the second converter 12 so that the output current of the second converter 12 is maximum, and the output voltage of the second converter 12 is minimized. For example, the control circuit 13 controls the operation of the second converter 12 so that the value obtained by dividing the output current by the output voltage is maximized. In other words, the control circuit 13, while lowering the ratio of the second converter 12 to the voltage output by the power converter 10 to the battery 2, controls the operation of the second converter 12 so that the load ratio of the second converter 12 to the voltage output to the battery 2 is low, and the load ratio of the second converter 12 to the voltage output to the battery 2 is high. The power supplied to the battery 2 by the power converter 10 includes the output power of the first converter 11 and the output power of the second converter 12. By increasing the load ratio of the second converter 12, the load ratio of the power the first converter 11 is relatively low, and the range of power that can be output by the first converter 11 is expanded. That is, since the first converter 11 can expand the range of the operable boost ratio, the first converter 11 can be operated with a high boost ratio conversion efficiency.

In one example of control for the first converter 11 and second converter 12 described above, the control circuit 13, so as to maximize the generated power of the solar cell module 1, while operating the first converter 11, so that the conversion efficiency of the first converter 11 is increased, the second converter 12 to operate. That is, the control circuit 13, at that time, together with the output power of the first converter 11 is maximized, so that the conversion efficiency of the first converter 11 is increased, to control the operation of the first converter 11 and second converter 12. Thus, even when the generated power of the solar cell module 1 fluctuates, it is possible to increase the power supplied to the battery 2 while improving the power conversion efficiency of the first converter 11.

As described above, in control method of the power converter 10 or the power converter 10 according to the present embodiment, the first converter 11 is connected to the solar cell module 1 and the battery 2, converts the output power of the solar cell module 1, and outputs the converted power to the battery 2. The second converter 12 is connected to the battery 2, and converts the voltage between the connection terminal 2a and the connection terminal 2b of the battery 2. Then, the control circuit 13, based on the output voltage of the solar cell module 1, controls the operation of the second converter 12 to use the output power of the second converter 12 to charge the battery 2. Thus, even when the input voltage of the first converter 11 fluctuates due to weather conditions or the like, the battery 2 can be charged without providing another battery for charging the battery 2, thereby preventing the power conversion system 100 from becoming larger.

Further, in the present embodiment, the input terminal 12a of the second converter 12 is connected to the battery 2 through a connection terminal 2a, the output terminal 12c of the second converter 12 is connected to output terminal 11d of the first converter 11. The control circuit 13 superimposes the output voltage of the second converter 12 to the voltage of output terminal 11d of the first converter 11. Thus, the output voltage of the solar cell module 1 is reduced, even when the first converter 11 can not be boosted to the voltage of the battery 2, the first converter 11 can output a voltage corresponding to the voltage of the battery 2.

Furthermore, in the present embodiment, the control circuit 13 controls the operation of the first converter 11 so that the input power of the first converter 11 is maximized, and controls the operation of the second converter 12 so that the value obtained by dividing the output current of the second converter 12 by the output voltage of the second converter 12. Thus, while improving the conversion efficiency of the first converter 11, it is possible to increase the power supplied to the battery 2.

In addition, in the present embodiment, the second converter 12 has a diode 15 to limit the direction of current flowing through output terminal 12c in one direction.

The output terminal 12c of the second converter 12 is conductive to the connecting terminal 2b of the battery 2 via diode 15. Thus, when the output voltage of the solar cell module 1 is relatively high, the second converter 12 is stopped, it is possible to charge the battery 2 only in the first converter 11. As a result, it is possible to suppress the power consumption of the second converter 12 and to improve the power conversion efficiency of the power converter 10.

Further, in the present embodiment, the maximum value of the output voltage of the solar cell module 1 is 60V or less, and the voltage of the battery 2 is four times or more of the maximum voltage of the solar cell module 1. Further, the first converter 11 has an isolation transformer 14 for isolating the input terminal 11a, 11b and output terminal 11c, 11d. Thus, the power converter 10 can be mounted on vehicle. Examples include providing a PV module on the exterior of vehicle and providing a power converter 10 in the cabin or under the floor.

Furthermore, in the present embodiment, the first converter 11 boosts the output voltage of the solar cell module 1 in accordance with the boost ratio. The control circuit 13, when the product of the maximum boost ratio of the output voltage and the first converter 11 of the solar cell module 1 is smaller than the voltage of the battery 2, controls the operation of the first converter 11 so as to operate at the maximum boost ratio. Thus, the output voltage of the solar cell module 1 is reduced, even when the first converter 11 can not be boosted to the voltage of the battery 2, while improving the conversion efficiency of the first converter 11, it is possible to charge the battery 2.

In addition, in the present embodiment, the control circuit 13 stops the second converter 12 so that the output power of the second converter 12 is not used for charging the battery 2 when the product of the output voltage of the solar cell module 1 and the rated boost ratio of the first converter 11 is larger than the voltage of the battery 2. Thus, when the output voltage of the solar cell module 1 is relatively high, it is possible to suppress the power consumption of the second converter 12 and improve the power conversion efficiency of the power converter 10.

Further, in the present embodiment, the control circuit 13 controls the operation of the second converter 12 so that the value obtained by dividing the current voltage of the second converter 12 by the output voltage of the second converter 12 is maximized, when the product of the output voltage of the solar cell module 1 and the rated boost ratio of the first converter 11 is smaller than the voltage of the battery 2, and the product of the output voltage of the solar cell module 1 and the maximum rating ratio of the first converter 11 is greater than the voltage of the battery 2. Thus, the first converter 11 can operate at a high boost ratio of the conversion efficiency, it is possible to increase the power supplied to the battery 2.

Figure 4:
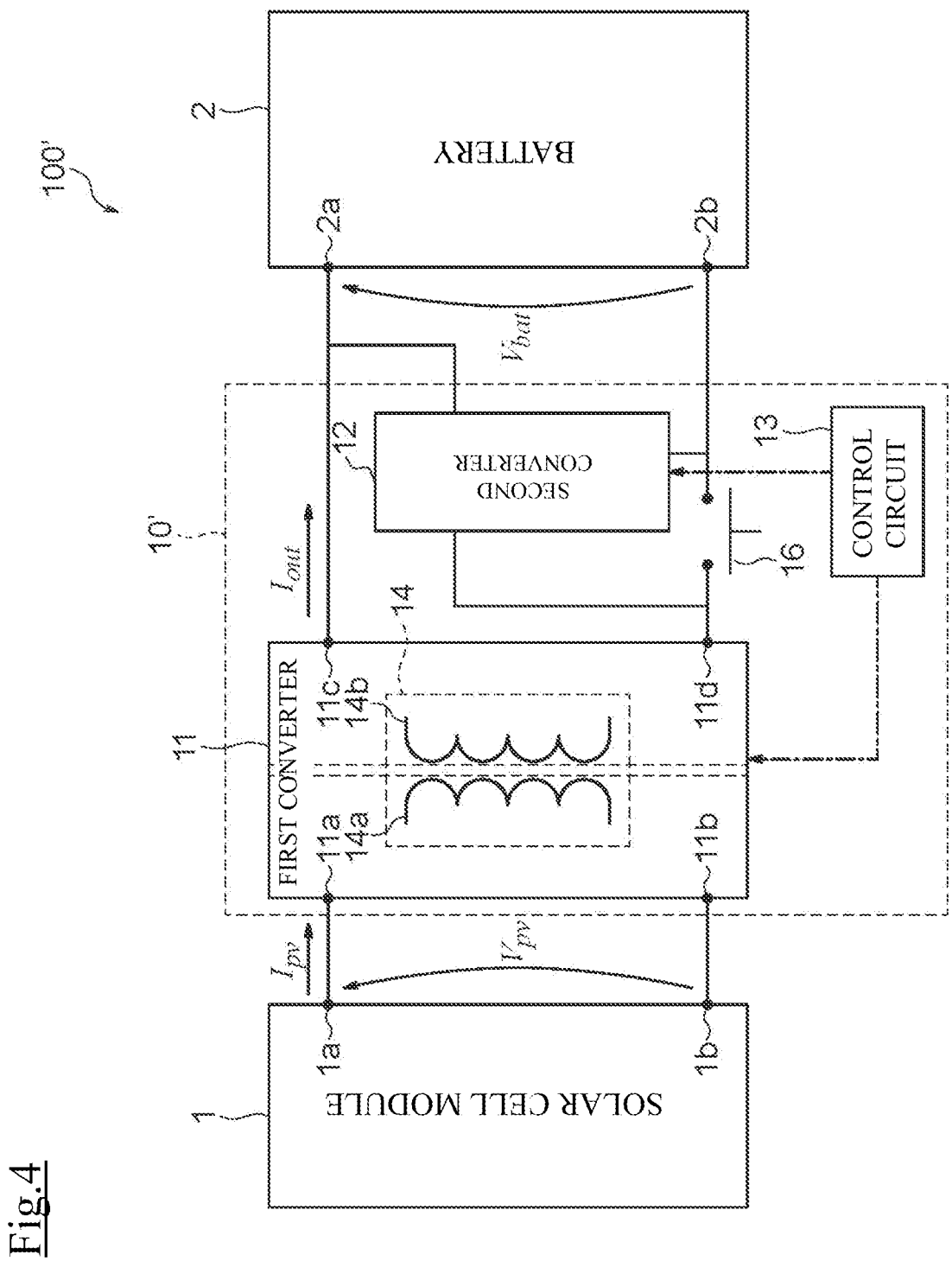
FIG. 4 is a circuit diagram of a power conversion system including a modification of the power conversion apparatus according to the first embodiment.

In the present embodiment, an example is given in which the second converter 12 has a diode 15 and the output terminal 11d of the first converter 11 and the connection terminal 2b of the battery 2 are electrically connected when the second converter 12 is stopped. However, the present embodiment is not limited to this example. For example, as shown in FIG. 4, instead of diode 15, a conductable/non-conductable relay 16 may be connected between the connecting terminal 2b of output terminal 11d and the battery 2 of the first converter 11, as the relay 16. By providing the relay 16, the voltage drop due to current flowing through diode 15 does not occur, when the relay 16 is turned on, and it is possible to reduce the potential difference between output terminal 11d of the first converter 11 and the connection terminal 2b of the battery 2. Incidentally, FIG. 4 is a schematic diagram of a power conversion system 100' including a modification of the power conversion apparatus 10' according to the first embodiment.

Second Embodiment

Figure 5:
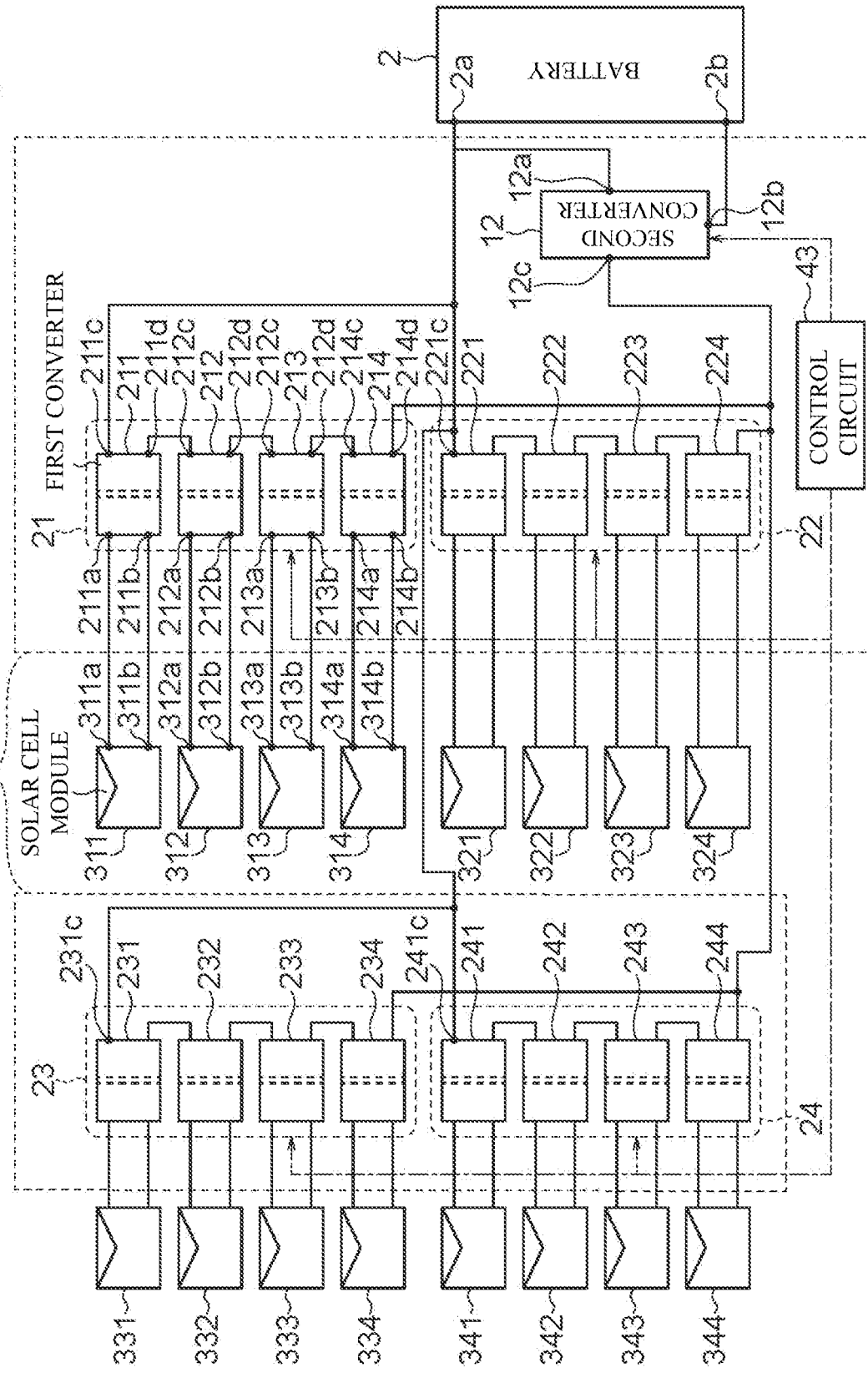
FIG. 5 is a circuit diagram of a power conversion system including a power conversion apparatus according to a second embodiment.

Next, a power converter according to the second embodiment will be described. FIG. 5 is a circuit diagram of a power conversion system 200 including the power converter 20 according to the second embodiment. The power conversion system 200 according to this embodiment includes a plurality of solar cell modules (311 to 314, 321 to 324, 331 to 334, 341 to 344), a battery 2, and a power conversion apparatus 20. Incidentally, the same reference numerals as those used for the description in the first embodiment are given to the same following configurations as those in the first embodiment. For the same configuration as that of the first embodiment, the description given in the first embodiment will be appropriately incorporated.

As described in the first embodiment described above, the solar cell module can be configured with a series connection of a plurality of solar cells, but as the number of solar cells connected in series increases, the probability that the solar cell is shaded increases, and the probability that the generated power of the solar cell module is significantly reduced increases. That is, even if there are a large number of non-shaded solar cells, the possibility of these cells generating electricity is likely to be lost. Further, even if the solar cell module is not shaded, when a difference in the amount of sunshine occurs for each solar cell, the solar cell module outputs the optimum power as a whole solar cell module, when viewed for each solar cell, it is not possible to operate at the optimum operating point, and it is likely that the opportunity for the solar cell to generate power under the optimum conditions is lost. As an example in preparation for such a case, in the power conversion system 200, instead of reducing the number of solar cells included in the solar cell module, a plurality of solar cell modules are provided, and the generated power of each solar cell module is configured to sum. The number of solar cells included in each solar cell module shown in FIG. 5 is assumed to be less than the number of solar cells included in the solar cell module 1 according to the first embodiment described above. Therefore, the output voltage of each solar cell module shown in FIG. 5 is lower than the output voltage of the solar cell module 1 in the first embodiment.

The power conversion apparatus 20 according to this embodiment includes a plurality of first converter groups 21 to 24 including a plurality of first converters (211 to 214, 221 to 224, 231 to 234, 241 to 244) corresponding to each solar cell module for a plurality of solar cell modules (311 to 314, 321 to 324, 331 to 334, 341 to 344), a second converter 12, and a control circuit 43. In the present embodiment, the first converter group 21 to 24 are all the same configuration. Therefore, the first converter group 21 will be described, and the explanations in the first converter group 21 will be appropriately incorporated for the first converter groups 22 to 24.

The first converter group 21 includes a plurality of first converters 211-214 corresponding to the plurality of solar cell modules 311-314. Each of the first converters 211 to 214 receives a control signal from the control circuit 43, and each of the first converters 211 to 214 boosts the output voltage of the solar cell module in accordance with the control signal, similarly to the first converter 11 according to the first embodiment. That is, the first converter 211 converts the generated power of the solar cell module 311, the first converter 212 converts the generated power of the solar cell module 312, the first converter 213 converts the generated power of the solar cell module 313, and the first converter 214 converts the generated power of the solar cell module 314.

Further, as shown in FIG. 5, output terminal of the first converters 211 to 214 are sequentially connected in series. That is, the output terminal 211d of the first converter 211 is connected to output terminal 212c of the first converter 212, the output terminal 212d of the first converter 212 is connected to the output terminal 213c of the first converter 213, and the output terminal 213d of the first converter 213 is connected to the output terminal 214c of the first converter 214. The output terminal 211c of the first converter 211 is connected to the battery 2, and the output terminal 214d of the first converter 214 is connected to the output terminal 12c of the second converter 12.

By sequentially connecting output terminal of the first converters 211 to 214 in series, The first converter 214 outputs a voltage with respect to the potential of the output terminal 12c of the second converter 12 to the output terminal 213d of the first converter 213. The first converter 213 outputs a voltage with respect to the potential of output terminal 214d to output terminal 212d of the first converter 212. The first converter 212 outputs voltages with respect to the potential of output terminal 213d to output terminal 211d of the first converter 211. The first converter 211 outputs a voltage with respect to the potential of output terminal 212d to the connecting terminal 2a of the battery 2. Thus, in the present embodiment, the first converter group 21 outputs a voltage obtained by superimposing the output voltages of each of the first converters 211 to 214 to the battery 2. Further, the first converter group 21 outputs the power obtained by summing the output power of each of the first converters 211 to 214 to the battery 2.

At this time, when the second converter 12 is operating, the first converter group 21, further output power obtained by adding the output power of the second converter 12, to the battery 2.

As shown in FIG. 5, the output terminal 211c of the first converter group 21 is connected to the connecting terminal 2a of the battery 2, and is connected to output terminal 221c of the first converter group 22, output terminal 231c of the first converter group 23, and output terminal 241c of the first converter group 24. That is, the respective output terminals of the first converter group 21 to 24 are connected in parallel. Power obtained by summing the output power of the first converter group 21, the output power of the first converter group 22, the output power of the first converter group 23, and the output power of the first converter group 24 is input to the battery 2. For example, when the solar modules 311-314 are shaded and the other solar modules are not shaded, the output power of the first converter group 21 is reduced, but the output power of the other first converter groups 22-24 is not be reduced. Therefore, in order to compensate for the output power of the first converter group 21, by controlling the operation of the first converter corresponding to the solar cell module that is not shaded, even if a shadow is applied to some of the solar cell modules, it is possible to maintain the charge amount of the battery 2.

The control circuit 43 has the same function as the control circuit 13 except that the function of determining whether to operate the second converter 12, as compared with the control circuit 13 according to the first embodiment described above.

Therefore, the explanation given in the control circuit 13 is appropriately incorporated.

The control circuit 43 determines whether or not the output voltage of the solar cell module can be boosted to the voltage of the battery 2 for each first converter group. The control circuit 43 operates the second converter 12 when it is determined that the output voltage of the solar cell module cannot be boosted to the voltage of the battery 2 in any of the first converter groups 21 to 24.

Further, the control circuit 43 stops the second converter 12 when it is determined that the first converter can operate at the rated boost ratio in any of the first converter groups 21 to 24.

Further, in any of the first converter groups 21 to 24, the control circuit 43 controls the operation of the first converter 11 so that the input power of the first converter 12 is maximum and the control circuit 43 controls the operation of the second converter 12 so that the value obtained by dividing the output current by the output voltage becomes the maximum, when the output voltage of the solar cell module can be boosted up to the voltage of the battery 2 but the first converter cannot be operated at the rated boost ratio. Since the control circuit 43 performs the same calculation and control for each of the first converter groups, the first converter group 21 will be described below as an example.

The control circuit 43 calculates the product of the output voltage of the solar cell module and the maximum boost ratio of the first converter for each of the first converters 211 to 214. For example, the control circuit 43 calculates the product of the maximum boost ratio of the output voltage and the first converter 211 of the solar cell module 311.

Further, the control circuit 43 calculates the voltage that each of the first converters 211 to 214 must output in order to output the voltage of the battery 2 as the first converter group 21. In the case of the example of FIG. 5, the first converter group 21 is configured to include four solar modules and four first converters. The control circuit 43 calculates a minimum voltage (hereinafter, also referred to as a required voltage) required for each of the first converters 211 to 214 by dividing the voltage of the battery 2 by 4. Then, the control circuit 43 compares the product of the output voltage and the maximum boost ratio of the solar cell module with the calculated required voltage, and operate the second converter 12, in any of the comparison results, when the product of the maximum boost ratio is smaller than the required voltage.

Further, the control circuit 43, in any of the first converter included in the first converter group 21 to 24, when the product of the maximum boost ratio is smaller than the required voltage, identify the first converter group including the first converter of the object as the target first converter group. Then, the control circuit 43, for the first converter group of interest, similarly to the first embodiment, controls the operation of the first converter so as to operate at a boost ratio of the maximum boost ratio.

Further, the control circuit 43 calculates the product of the output voltage of the solar cell module and the rated boost ratio of the first converter for each of the first converters 211 to 214 included in the first converter group 21. The control circuit 43, in any of the first converter, if the product of the output voltage and the rated boost ratio of the solar cell module is smaller than the required voltage, to stop the second converter 12.

Further, the control circuit 43, for each first converter, the product of the output voltage of the solar cell and the rated boost ratio of the first converter is smaller than the required voltage, and the output voltage of the solar cell and the product of the maximum boost ratio of the first converter is larger than the required voltage, the second converter 12 to operate. In this case, the control circuit 43, as in the first embodiment, controls the operation of the second converter 11 so that the input power of the first converter is maximized and the control circuit 43 controls the operation of the second converter 12 so that the value obtained by dividing the output current by the output voltage is maximized.

As described above, in control method of the power converter 20 or the power converter 20 according to the present embodiment, the power converter 20 includes the first converter group 21 including the first converters 211 to 214 corresponding to the respective solar cell modules for the plurality of solar cell modules 311 to 314. The output terminals of each of the first converters 211 to 214 are sequentially connected in series. This reduces the possibility that shadow-less solar cells lose their chance to generate electricity even when partial shadows occur. It can also reduce the possibility that the solar cells lose opportunities to generate electricity under optimal conditions.

Further, in control method of the power converter 20 and the power converter 20 according to the present embodiment, the power converter 20 includes a plurality of first converter groups 21 to 24. The output terminals of each of the first convertor groups 21 to 24 are connected in parallel. Thus, the same effect as described above is achieved.

Furthermore, in the present embodiment, the control circuit 43 calculates the required voltage per one first converter based on the voltage of the battery 2 as the required voltage, for each first converter, calculates the product of the output voltage and the maximum boost ratio of the solar cell module calculates, and compares the calculation result with the required voltage. The control circuit 43, in any of the comparison results, when the product of the output voltage and the maximum boost ratio of the solar cell module is smaller than the required voltage, the control circuit 43 identifies the first converter group in which the first converter of target is included, as the target first converter group. The control circuit 43, for the first converter group of interest, controls the operation of the first converter so as to operate at a boost ratio of the maximum boost ratio or its periphery. Thus, the output voltage of any of the solar cell modules of the plurality of solar cell modules is lowered, even when it is impossible to boost the voltage of the battery 2 in the first converter group, the conversion efficiency of the first converter increases, it is possible to charge the battery 2.

In addition, in the present embodiment, the control circuit 43, for each first converter, calculates the product of the output voltage and the rated boost ratio of the solar cell module, and compares the calculation result with the required voltage. The control circuit 43 stops the second converter 12 so that the output power of the second converter 12 is not used for charging the battery 2 in either comparison result, when the product of the output voltage of the solar cell module and the rated boost ratio is larger than the required voltage. Thus, when the output voltage of the solar cell module 1 is relatively high, it is possible to suppress the power consumption of the second converter 12, it is possible to improve the power conversion efficiency of the power converter 20.

In addition, in the present embodiment, the control circuit 43, for each first converter, calculates the product of the output voltage and the maximum boost ratio of the solar cell module, and compares the calculation result with the required voltage. Further, the control circuit 43 calculates the product of the output voltage and the rated boost ratio of the solar cell module, and compares the calculation result with the required voltage. Then, the control circuit 43 controls the operation of the second converter so that the value obtained by dividing the output current by the output voltage is maximum, in any of the comparison results, when the product of the output voltage of the solar cell module and the maximum boost ratio is smaller than the required voltage, and the product of the output voltage of the solar cell module and the rated boost ratio is larger than the required voltage. Thus, the first converter can operate at a high boost ratio of the conversion efficiency, it is possible to increase the power supplied to the battery 2.

Third Embodiment

Figure 6:
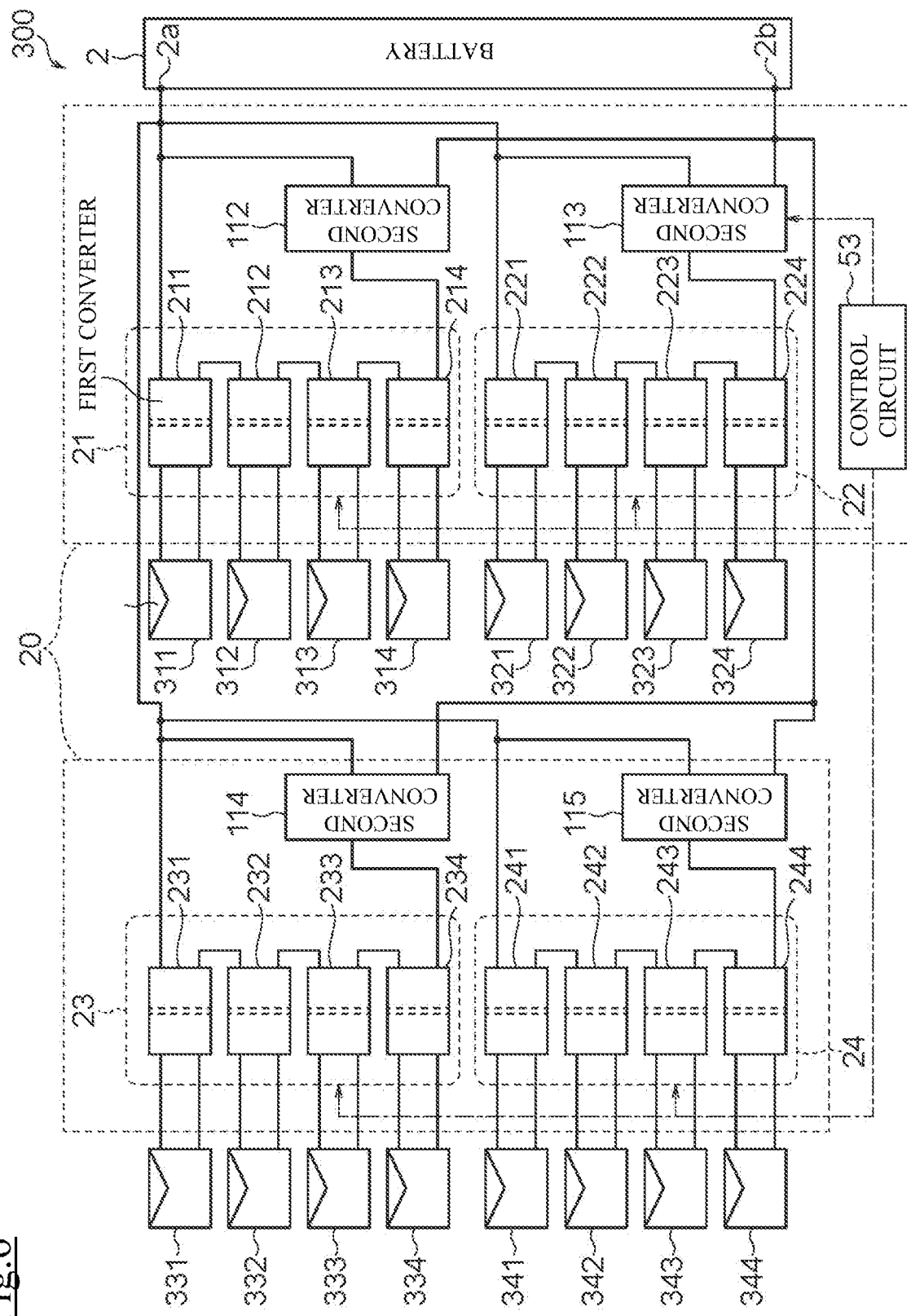
FIG. 6 is a circuit diagram of a power conversion system including a power conversion apparatus according to a third embodiment.

Next, a power conversion apparatus according to the third embodiment will be explained. FIG. 6 is a circuit diagram of a power conversion system 300 including a power converter 30 according to the third embodiment. Power converter 30 according to the present embodiment, as compared with the power converter 20 according to the second embodiment described above, has the same configuration except for the number of the second converter. Therefore, the same configuration as that of the second embodiment, the description given in the second embodiment will be appropriately incorporated.

The power conversion apparatus 30 includes second converters 112 to 114 for each of the first converter groups 21 to 24. Specifically, the second converter 112 is provided corresponding to the first converter group 21, the second converter 113 is provided corresponding to the first converter group 22, the second converter 114 is provided corresponding to the first converter group 23, the second converter 115 is provided corresponding to the first converter group 24. The connection relationship between the first converter group and the second converter is similar to the connection relationship between the first converter 11 and the second converter 12 in the first embodiment described above.

As described above, in control method of the power converter 30 or the power converter 30 according to the present embodiment, the power converter 30 includes the second converters 112 to 114 for each of the first converter groups 21 to 24. Thus, for each first converter group, it is possible to perform the control of the second converter, it is possible to optimal operation for each first converter group, as a result, the power conversion efficiency of the power conversion system 300 is improved, it is possible to increase the power supplied to the battery 2.

Fourth Embodiment

Figure 7:
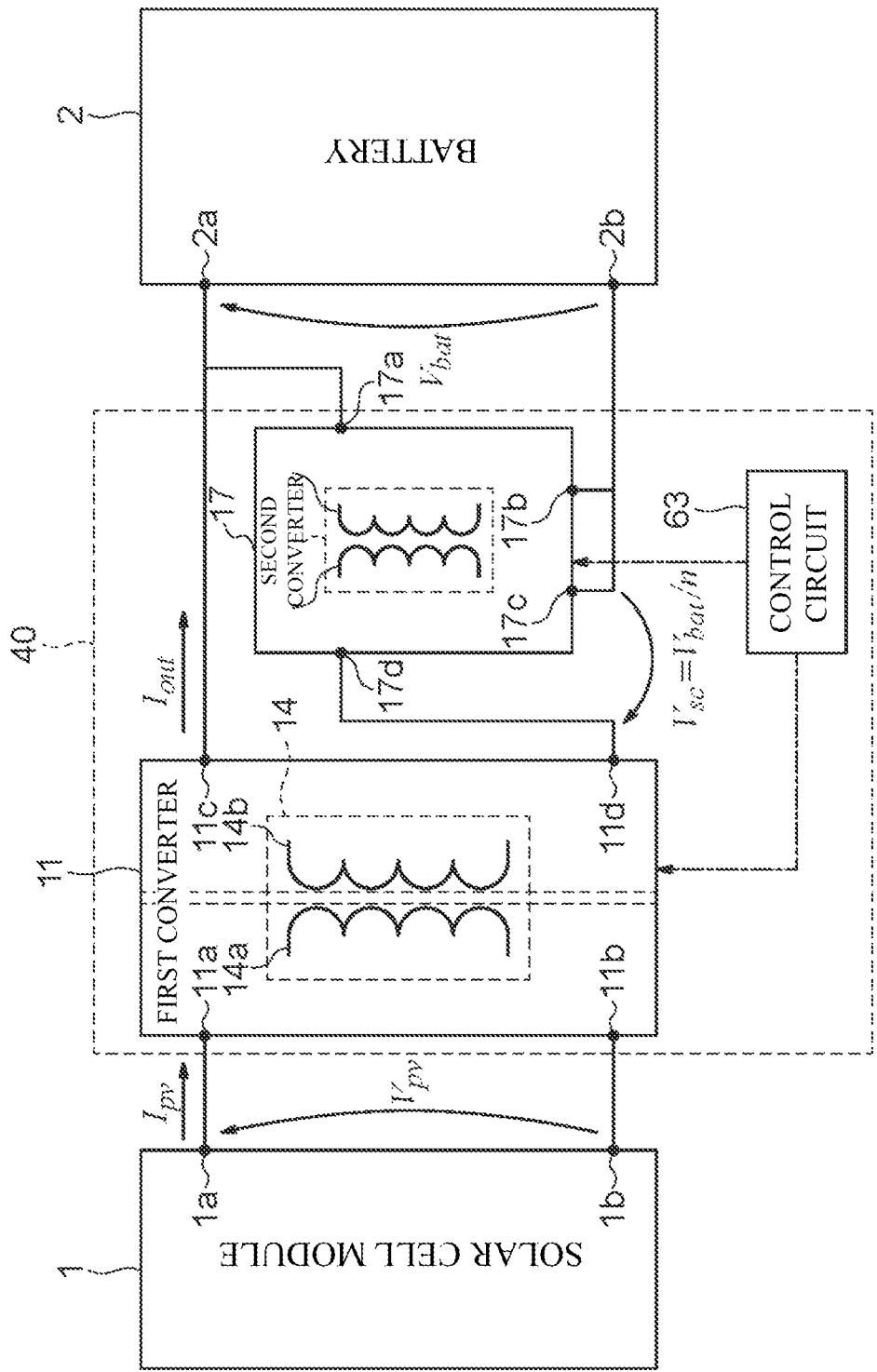
FIG. 7 is a circuit diagram of a power conversion system including a power conversion apparatus according to a fourth embodiment.

Next, a power converter according to a fourth embodiment will be explained. FIG. 7 is a circuit diagram of a power conversion system 400 including the power converter 40 according to the fourth embodiment. Power converter 40 according to the present embodiment, as compared with the power converter 10 according to the first embodiment described above, has the same configuration except for the circuit configuration of the second converter 17 and the control of the control circuit 63 for the second converter 17. Therefore, the same configuration as that of the first embodiment, the description given in the second embodiment will be appropriately incorporated.

The second converter 17, similarly to the second converter 12 in the first embodiment, is a step-down DC-DC converter. The second converter 17 has an input terminal 17a, and 17b, output terminal 17c, 17d. Input terminal 17a is connected to the connection terminal 2a of the battery 2, the input terminal 17b and output terminal 17c is connected to the connection terminal 2b of the battery 2. Output terminal 17d is connected to output terminal 11d of the first converter 11. Incidentally, for easy to explanation, the input terminal 17a is a terminal of higher potential side than the input terminal 17b, output terminal 17d is a terminal of higher potential side than output terminal 17c.

Further, the second converter 17 has an isolation transformer 18, and the second converter 17 is an isolation type of DC-DC converter. Isolation transformer 18 has a primary winding 18a provided on the input side and a secondary winding 18b provided on the output side. The second converter 17 is configured with, for example, a inverter circuit connected to the primary winding 18a and a rectifier circuit connected to the secondary winding 18b.

Control circuit 63 controls the operation of the second converter 17 so that the ratio of the output voltage to the input voltage is constant. In FIG. 7, the output voltage (Vsc) of the second converter 17 indicates that the ratio of the battery 2 to the voltage (Vbat) is constant.

Further, the control circuit 63 controls the operation of the second converter 17 so that inverter circuit in the second converter 17 is soft-switched. For example, the control circuit 63 soft-switches the second converter 17 to keep the ratio of the output voltage to the input voltage constant by controlling the switching frequency of switching element and the duty ratio. By having the above circuit configuration and control, since the second converter 17 always performs soft switching operation, it is possible to significantly reduce the power consumption of the second converter 17.

As described above, in control method of the power converter 40 or the power converter 40 according to the present embodiment, the control circuit 63 soft-switches the element included in the second converter 17 and controls the operation of the second converter 17 so that the ratio of the output voltage to the input voltage is constant. When the first converter 11 cannot boost the output voltage of the solar cell module 1 to the voltage of the battery 2, the voltage that the second converter 17 must output is proportional to the voltage of the battery 2. That is, the higher the voltage of the battery 2, the higher the voltage that the second converter 17 must output, and the lower the voltage of the battery 2, the lower the voltage that the second converter 17 must output. For example, when the voltage of the battery 2 is relatively high, the output voltage of the second converter 17 is increased in accordance with the voltage of the battery 2. In this case, while outputting a high voltage, to operate in soft switching, it is possible to effectively suppress the power consumption of the second converter 17. Similarly, for example, even when the voltage of the battery 2 is relatively low, while outputting a low voltage, since the element operates in soft switching, it is possible to effectively suppress the power consumption of the second converter 17.

It should be noted that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the first embodiment described above, the output terminal 12c of the second converter is connected to the output terminal 11d of the first converter 11 for superimposing the output voltage of the second converter 12 to voltage of the output terminal 11d of the first converter 11. The output terminal 12c of the second converter 12 may be connected to the input terminal 11b of the first converter 11. In this case, the output voltage of the second converter 12, for superimposing on the voltage of the input terminal 11b of the first converter 11, the voltage boosted by the first converter 11 is the voltage obtained by superimposing (summing) the output voltage of the second converter 12 to the output voltage of the battery 2. Thus, the output voltage of the battery 2 is reduced, even when the first converter 11 can not be boosted to the voltage of the battery 2, the first converter 11 can output a voltage corresponding to the voltage of the battery 2.

For example, although the power conversion apparatus or the method of the power conversion apparatus according to the present invention will be described herein referring to the power conversion apparatus 10, 20, 30, and 40, the present invention is not limited thereto. Further, in this specification, the first converter 11 will be described as example of the first power conversion circuit according to the present invention, the present invention is not limited thereto. Further, in this specification, the second converters 12 and 17 will be described as examples of the second power conversion circuit according to the present invention, but the present invention is not limited thereto.

EXPLANATIONS OF LETTERS OR NUMERALS

100 Power conversion system
1 Solar cell module
1a output terminal
1b output terminal
2 Battery
2a connecting terminal
2b connecting terminal
10 . . . POWER CONVERTER
11 First converter
11a Input terminal
11b Input terminal
11c output terminal
11d output terminal
14 Isolation transformer
14a Primary winding
14b Secondary winding
12 Second converter
12a Input terminal
12b Reference pin
12c output terminal
13 Control circuit

The invention claimed is:

1. A control method for controlling a power converter including a first power conversion circuit and a second power conversion circuit by using a control circuit, the first power conversion circuit connected to a solar cell module and a capacitor, converting output power of the solar cell module, and outputting the converted power to the capacitor, the second power conversion circuit connected to the capacitor, and converting a voltage input from the capacitor, the control method comprising:

controlling operation of the second power conversion circuit based on the output voltage of the solar cell module to supply power obtained by summing output voltage of the first power conversion and output voltage of the second power conversion to the capacitor.

2. The control method according to claim 1, further comprising:
superimposing output voltage of the second power conversion circuit to voltage of an input terminal or an output terminal of the first power conversion circuit.

3. The control method according to claim 1, wherein an input terminal of the second power conversion circuit is connected to the capacitor and an output terminal of the second power conversion circuit is connected to an output terminal of lower potential side of output terminals of the first power converting circuit,
the method comprises superimposing output voltage of the second power conversion circuit to voltage of the output terminal of lower potential side of the first power converting circuit.

4. The control method according to claim 1, comprising:
controlling operation of the first conversion circuit so that input voltage of the first conversion circuit is maximized; and
controlling operation of the second conversion circuit so that a value obtained by dividing output current of the second power conversion circuit by output voltage of the second power conversion circuit is maximized.

5. The control method according to claim 1, wherein
the second power conversion circuit includes an element for limiting a direction of current flowing through an output terminal in one direction, and
the output terminal of the second power conversion circuit is conducted to a connection terminal of lower potential side of the capacitor through the element.

6. The control method according to claim 1, comprising
controlling operation of the second conversion circuit so that a switching element in the second conversion circuit is soft-switched and ratio of output voltage to input voltage of the second power conversion circuit is constant.

7. The control method according to claim 1, wherein
a maximum value of output voltage of the solar cell module is 60V or less,
voltage of the capacitor is four times or more of the maximum value, and
input terminal and output terminal of the first power conversion circuit are connected through an isolation element.

8. The control method according to claim 1, wherein
the first power conversion circuit boosts output voltage of the solar cell module in accordance with a boost rate,
the method comprises controlling operation of the first power conversion circuit at a first boost rate when a product of output voltage of the solar cell module and the first boost rate is smaller than voltage of the capacitor, and
the first boost rate is a maximum boost rate of the first power conversion circuit.

9. The control method according to claim 1, wherein
the first power conversion circuit boosts output voltage of the solar cell module in accordance with a boost rate,
the method comprises controlling operation of the second power conversion circuit so that output of the second power conversion circuit is not used for a charge of the capacitor when a product of output voltage of the solar cell module and a second boost rate is larger than voltage of the capacitor, and
the second boost rate is a rated boost rate of the first power conversion circuit.

10. The control method according to claim 1, wherein
the first power conversion circuit boosts output voltage of the solar cell module in accordance with a boost rate,
the method comprises controlling operation of the second power conversion circuit so that a value obtained by dividing output current of the second power conversion circuit by output voltage of the second power conversion circuit is maximized, when a product of output voltage of the solar cell module and a second boost rate is smaller than voltage of the capacitor and a product of output voltage of the solar cell module and a first boost rate is larger than voltage of the capacitor,
the first boost rate is a maximum boost rate of the first power conversion circuit, and
the second boost rate is a rated boost rate of the first power conversion circuit.

11. The control method according to claim 1, wherein
the power converter includes a first power conversion circuit group having a plurality of the first power conversion circuits corresponding to each of a plurality of solar cell modules, and
each output terminal of the first power converter is sequentially connected in series.

12. The control method according to claim 11, wherein
the power converter includes a plurality of the first power converter, and
each of terminals of the first power conversion circuit group is connected in parallel.

13. The control method according to claim 11, wherein
the first power conversion circuit boosts output voltage of the solar cell module in accordance with a boost ratio, and
the method comprises,
calculating voltage required for one of the first power conversion circuit as the required voltage,
comparing a product of output voltage of the solar cell module and the first boost rate with the required voltage for each of the first power conversion circuits,
in any of the comparison results, when the product of the output voltage of the solar cell module and the first boost rate is smaller than the required voltage, specifying the first power conversion circuit in which the product of the output voltage of the solar cell module and the first boost rate is smaller than the required voltage, as a target circuit group, and
controlling operation of the plurality of the first power conversion circuits included in the target circuit group so as to operate at the first boost rate,
the first boost rate is a maximum boost rate of the first power conversion circuit.

14. The control method according to claim 1, wherein
the first power conversion circuit boosts output voltage of the solar cell module in accordance with a boost ratio,
the method comprises,
calculating, based on voltage of the capacitor, voltage required for one of the first power conversion circuit as the required voltage,
comparing, for each of the first power conversion circuits, a product of output voltage of the solar cell module and second boost rate with the required voltage, in any of the comparison results, when the product of the output voltage of the solar cell module and the second boost rate is larger than the required voltage, controlling operation of the second conversion circuit so that output of the second power conversion circuit is not used for a charge of the capacitor, and the second boost rate is a rated boost rate of the first power conversion circuit.

15. The control method according to claim 1, wherein
the first power conversion circuit boosts output voltage of the solar cell module in accordance with a boost ratio,
the method comprises,
   calculating, based on voltage of the capacitor, voltage required for one of the first power conversion circuit as the required voltage,
   comparing, for each of the first power conversion circuits, a product of output voltage of the solar cell module and the first boost rate with the required voltage and a product of the output voltage of the solar cell module and the second boost rate with the required voltage, and
   in any of the comparison results, when the product of the output voltage of the solar cell module and the first boost rate is smaller than the required voltage and the product of the output voltage of the solar cell module and the second boost rate is larger than the required voltage, controlling operation of the second conversion circuit so that a value obtained by dividing output current of the second power conversion circuit by output voltage of the second power conversion circuit is maximized, the first boost rate is a maximum boost rate of the first power conversion circuit, and the second boost rate is a rated boost rate of the first power conversion circuit.

16. A power converter apparatus comprising:
a first power conversion circuit connected to a solar cell module and a capacitor, converting output power of the solar cell module, and outputting converted power to the capacitor;
a second power conversion circuit connected to the capacitor and converting voltage input from the capacitor; and
a controller circuit controlling operation of the first power conversion circuit and the second power conversion circuit,
wherein the controller circuit controls operation of the second power conversion circuit based on output of the solar cell module to supply power obtained by summing output voltage of the first power conversion and output voltage of the second power conversion to the capacitor.

* * * * *